United States Patent
Matsuo et al.

(10) Patent No.: US 7,938,442 B2
(45) Date of Patent: May 10, 2011

(54) STEERING COLUMN MOUNTED KNEE AIRBAG DEVICE

(75) Inventors: Tetsu Matsuo, Nissin (JP); Akiyoshi Sanada, Nishikamo-gun (JP); Kazuhiro Nakayama, Nishikasugai-gun (JP); Kazuaki Bito, Nishikasugai-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/694,859

(22) Filed: Jan. 27, 2010

(65) Prior Publication Data

US 2010/0244416 A1    Sep. 30, 2010

(30) Foreign Application Priority Data

Mar. 24, 2009   (JP) ................................. 2009-071548

(51) Int. Cl.
    *B60R 21/16*      (2006.01)
(52) U.S. Cl. ..................... 280/731; 280/728.3; 280/750; 280/777
(58) Field of Classification Search ............... 280/728.2, 280/728.3, 731, 750, 777
See application file for complete search history.

(56) References Cited

U.S. PATENT DOCUMENTS

| | | | |
|---|---|---|---|
| 7,681,908 B2 * | 3/2010 | Fukawatase et al. | 280/728.3 |
| 7,753,403 B2 * | 7/2010 | Fukawatase et al. | 280/730.1 |
| 7,823,911 B2 * | 11/2010 | Adachi et al. | 280/730.1 |
| 2007/0182134 A1 * | 8/2007 | Mizuno et al. | 280/730.1 |
| 2008/0116669 A1 * | 5/2008 | Adachi et al. | 280/730.1 |
| 2008/0122204 A1 * | 5/2008 | Fukawatase et al. | 280/728.3 |
| 2008/0217890 A1 * | 9/2008 | Fukawatase et al. | 280/731 |

FOREIGN PATENT DOCUMENTS

| | | |
|---|---|---|
| JP | A-2008-110705 | 5/2008 |
| JP | A-2008-110706 | 5/2008 |
| JP | A-2008-126735 | 6/2008 |
| JP | A-2008-126736 | 6/2008 |
| JP | A-2008-137598 | 6/2008 |
| JP | A-2008-155698 | 7/2008 |
| JP | A-2008-162530 | 7/2008 |
| WO | WO 2008/053981 A1 | 5/2008 |

* cited by examiner

*Primary Examiner* — Toan C To

(74) *Attorney, Agent, or Firm* — Oliff & Berridge, PLC

(57) ABSTRACT

A knee airbag device mounted on a steering column has an inner case in which a folded knee airbag is housed, and an outer case that is placed over the inner case. The outer case is fixed to a lower side of a vehicle-rear-side portion of a steering column that moves relative to a vehicle-front-side portion when a load equal to or greater than a threshold load is applied to the steering column in a direction of the axis of the steering column, and has a rigidity with which the shape of the folded knee airbag is maintained under normal conditions. The outer case has an opening formed in a region where the outer case would interfere with the vehicle-front-side portion when the vehicle-rear-side portion moves relative to the vehicle-front-side portion.

17 Claims, 8 Drawing Sheets

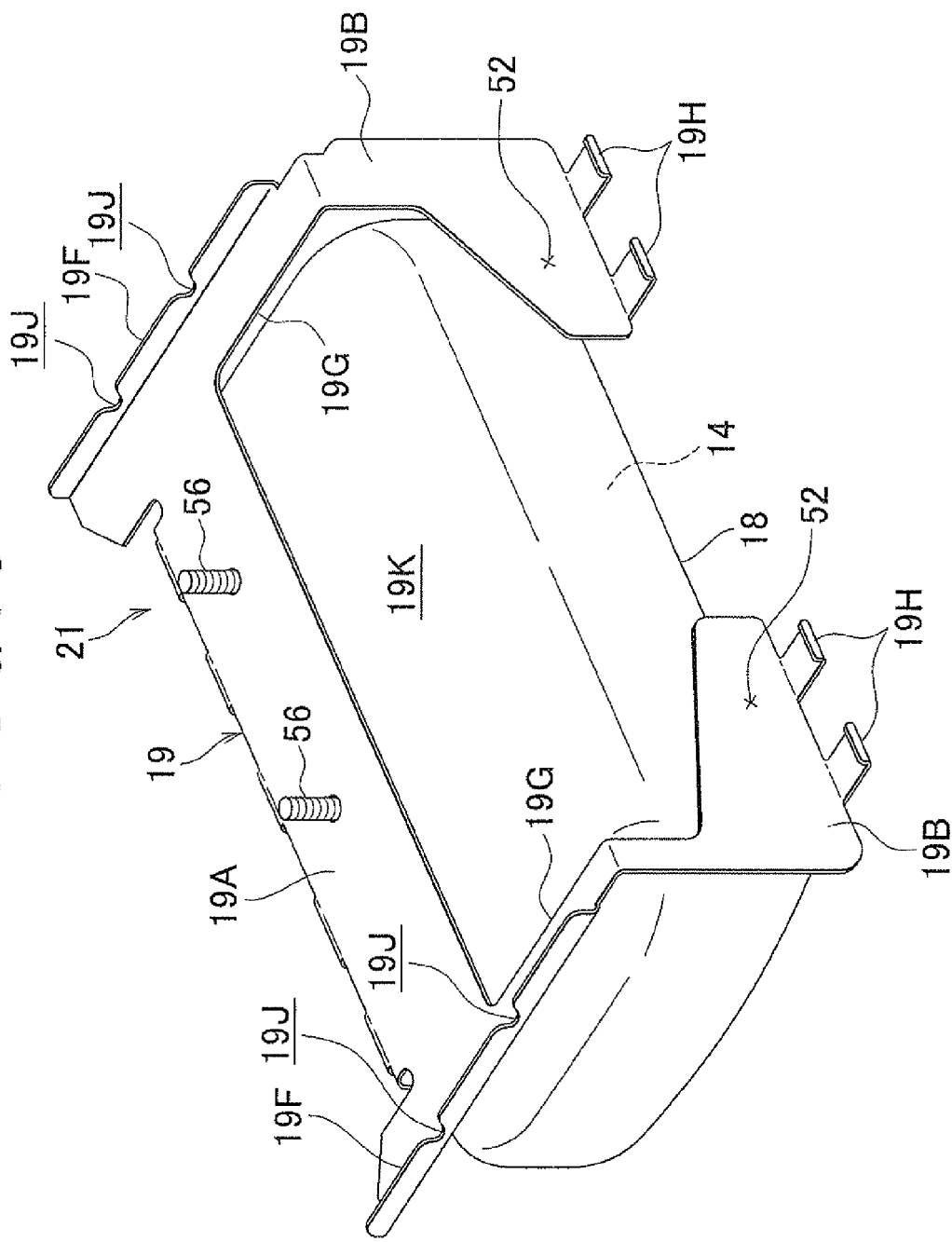

STEERING COLUMN MOUNTED KNEE AIRBAG DEVICE

INCORPORATION BY REFERENCE

The disclosure of Japanese Patent Application No. 2009-071548 filed on Mar. 24, 2009 including the specification, drawings and abstract is incorporated herein by reference in its entirety.

BACKGROUND OF THE INVENTION

1. Field of the Invention

The invention relates to a knee airbag device mounted on the steering column of a vehicle.

2. Description of the Related Art

In a knee protecting airbag device as disclosed in, for example, Japanese Patent Application Publication No. 2008-110706 (JP-A-2008-110706), a case that houses an airbag is integrally formed with a column cover in which a flexible sheet material is embedded. The case includes a flexible portion consisting of the sheet material and a mounting portion mounted to the steering column. The flexible portion is located, in a longitudinal direction of the vehicle, in a front portion of the case that interferes with a stationary member of the steering column when an impact force acts on the steering column and a movable member of the steering column moves forward along the axial direction. The flexible portion is also configured to extend backward from the column cover in the longitudinal direction of the vehicle. The mounting portion is formed with higher rigidity than that of the flexible portion and is located in the rear portion of the flexible portion in the longitudinal direction of the vehicle. With this arrangement, the airbag device does not hamper movement of the movable member when the steering column absorbs the impact force, and is also arranged to receive reaction force when the airbag is deployed.

In the conventional airbag device as described above, however, the case that houses the airbag consists principally of the flexible seat material, and it is therefore difficult to maintain the shape of the folded knee airbag. Also, the knee protecting airbag device needs to be designed under many restrictions so that the knee airbag do not interfere with the steering column when a tilting operation or telescopic operation is performed on the steering column.

SUMMARY OF THE INVENTION

The invention provides a steering column mounted knee airbag device that maintains the shape of a folded knee airbag, and assures a sufficiently large contraction stroke of the steering column for absorbing impact force.

A steering column mounted knee airbag device according to a first aspect of the invention includes: a knee airbag that is placed in a folded state within a column cover that covers a rear end portion of the steering column, and is configured to deploy toward the outside of the column cover when gas is supplied to the knee airbag; an inflator that is placed in the knee airbag, and is configured to supply the knee airbag with gas; an inner case that has flexibility and houses the folded knee airbag; and an outer member that is fixed to a lower side of a vehicle-rear-side portion of the steering column that moves relative to a vehicle-front-side portion of the steering column when a load equal to or greater than a threshold load is applied to the steering column in an axial direction of the steering column. The outer member has a rigidity with which the shape of the folded knee airbag is maintained under normal conditions. The outer member includes: a mounting portion mounted to the steering column, which is placed on an upper side of the inner case; and extensions that extend forward in a longitudinal direction of the vehicle from opposite end portions of the mounting portion and are spaced from each other by a distance larger than a length of the vehicle-front-side portion as measured in the width direction of the vehicle. The outer member further includes: front walls that are placed, in a longitudinal direction of the vehicle, on a front side of the inner case and extend downward from front ends of the extensions; and a rear wall that is placed, in a longitudinal direction of the vehicle, on a rear side of the inner case and extends downward from a rear end of the mounting portion. In the outer member, an opening is formed by the mounting portion, the extensions and the front walls and is located in a region where the outer member would interfere with the vehicle-front-side portion when the vehicle-rear-side portion moves relative to the vehicle-front-side portion.

In the knee airbag device according to the first aspect of the invention, the folded knee airbag is housed in the flexible inner case, and the outer member is placed on the upper, front and rear side of the inner case. Under normal conditions, the shape of the folded knee airbag can be maintained by the outer member.

When a load equal to or greater than a threshold load is applied to the steering column in the axial direction of the steering column, the vehicle-rear-side portion of the steering column moves relative to the vehicle-front-side portion of the steering column so that the steering column contracts to absorb impact force. The outer member is fixed to the lower side of the vehicle-rear-side portion of the steering column, and has the opening formed in the region where the outer member would interfere with the vehicle-front-side portion when the vehicle-rear-side portion moves relative to the vehicle-front-side portion. With this arrangement, when the steering column contracts, the vehicle-front-side portion is prevented from interfering with the outer member. Also, when the inner case interferes with the vehicle-front-side portion, deformation of the inner case allows the vehicle-rear-side portion to move relative to the vehicle-front-side portion. This arrangement assures a sufficiently large contraction stroke of the steering column.

In the knee airbag device according to the first aspect of the invention, the front and rear walls may be provided with front and rear engaging portions, respectively. The front and rear engaging portions are engaged with front and rear walls formed on a bottom wall of the column cover so as to extend upright toward the string column, respectively. Outer edges of the extensions in the width direction of the vehicle may be provided with engaging portions. The engaging portions are engaged with side walls of the column cover.

With the above arrangement in which the front and rear walls of the outer member are respectively provided with the front and rear engaging portions that are engaged with the front and rear walls formed on bottom wall of the column cover, reaction force is produced at the outer member in the initial stages of deployment of the knee airbag, and the inflation pressure of the knee airbag can act on the column cover. Therefore, airbag doors set in the column cover can be smoothly opened.

Also, with the above arrangement in which the outer edges of the extensions in the width direction of the vehicle are provided with engaging portions that are engaged with the side walls of the column cover, when the inflation pressure of the knee airbag acts on the side walls, the side walls are less likely or unlikely to deform outward in the width direction of the vehicle. Therefore, airbag doors set in the side walls of the column cover can be smoothly opened.

Thus, with the above arrangements, the airbag doors provided in the column cover can be smoothly opened, and the knee airbag can deploy toward the outside of the column cover at an initial time or in a short time.

Furthermore, the outer member may further include a connecting portion that connects the front walls of the outer member in a width direction of the vehicle. The connecting portion is located at a position where the front walls do not interfere with the vehicle-front-side portion of the steering column when the vehicle-rear-side portion moves relative to the vehicle-front-side portion.

In the arrangement as describe above, the front walls of the outer member are connected to each other by the connecting portion at a position where the outer member does not interfere with the vehicle-front-side portion of the steering column, thus increasing rigidity of the outer member. Therefore, under normal conditions, the shape of the folded knee airbag can be maintained with higher stability.

As explained above, the steering column mounted knee airbag device according to the first aspect of the invention provides excellent effects of maintaining the shape of the folded knee airbag under normal conditions, and assuring a sufficiently large contraction stroke of the steering column.

The knee airbag device having the above-mentioned engaging portions of the outer member for engagement with the column cover provides excellent effects of smoothly deploying airbag doors provided in the column cover, and deploying the knee airbag toward the outside of the column cover at an initial time or in a short time.

The knee airbag device in which the front walls of the outer member are connected to each other provides an excellent effect of maintaining the shape of the folded knee airbag with increased stability under normal conditions.

A steering column mounted knee airbag device according to a second embodiment of the invention includes a knee airbag that is placed in a folded state within a column cover that covers a rear end portion of the steering column, and is configured to deploy toward the outside of the column cover when gas is supplied to the knee airbag; an inflator that is placed in the knee airbag, and is configured to supply the knee airbag with gas; an inner case that has flexibility and houses the folded knee airbag; and an outer case that is placed over the inner case, and is fixed to a lower side of a vehicle-rear-side portion of the steering column that moves relative to a vehicle-front-side portion of the steering column when a load equal to or greater than a threshold load is applied to the steering column in an axial direction of the steering column. The outer case has a rigidity with which the shape of the folded knee airbag is maintained under normal conditions, and has an opening formed in a region in which the outer case would interfere with the vehicle-front-side portion when the vehicle-rear-side portion moves relative to the vehicle-front-side portion.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 8 is a perspective view showing a modified example of the outer case of the knee airbag module.

DETAILED DESCRIPTION OF EMBODIMENTS

Figure 1:
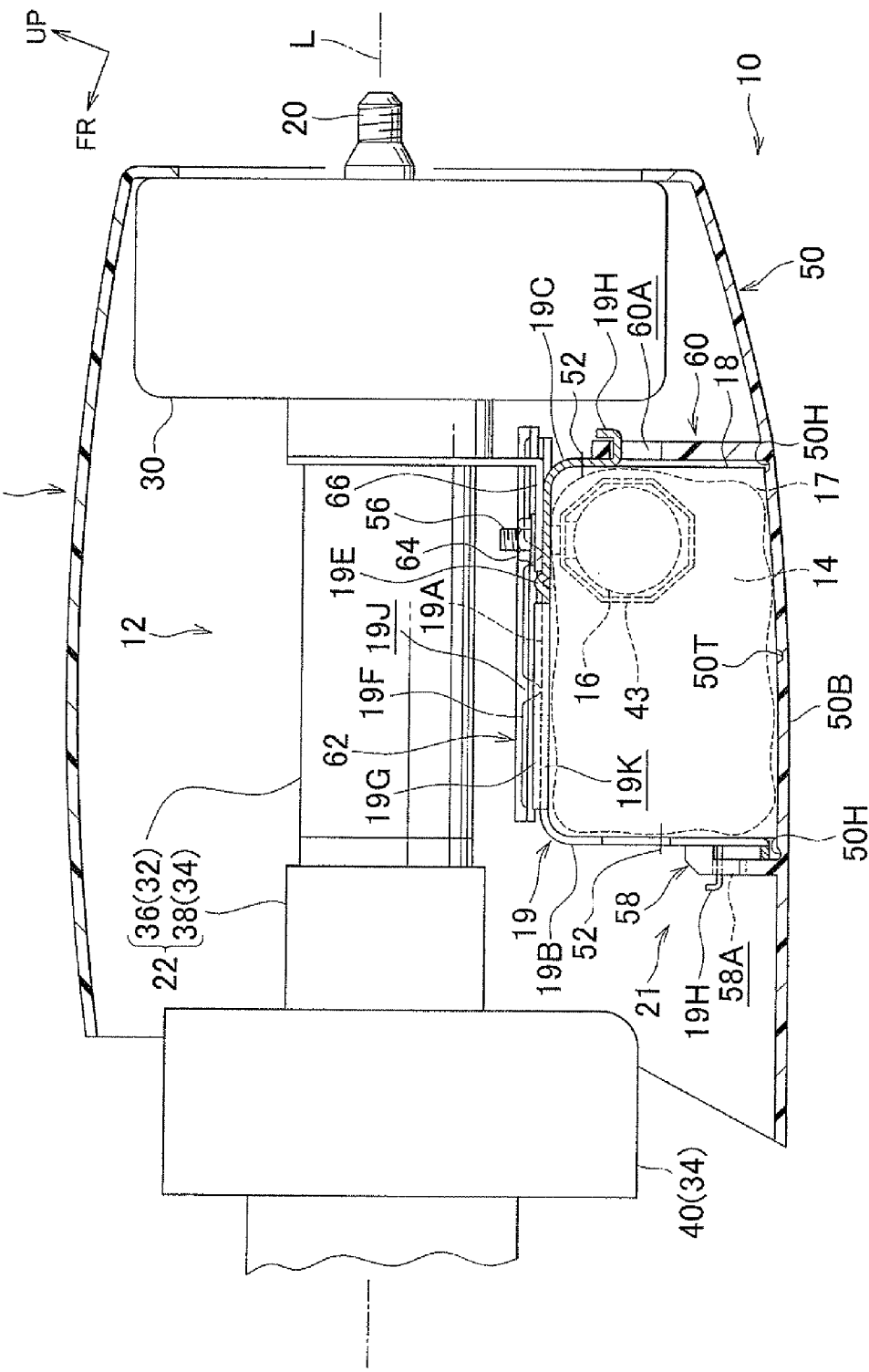
FIG. 1 is a cross-sectional view showing a steering column mounted knee airbag device.
Figure 2:
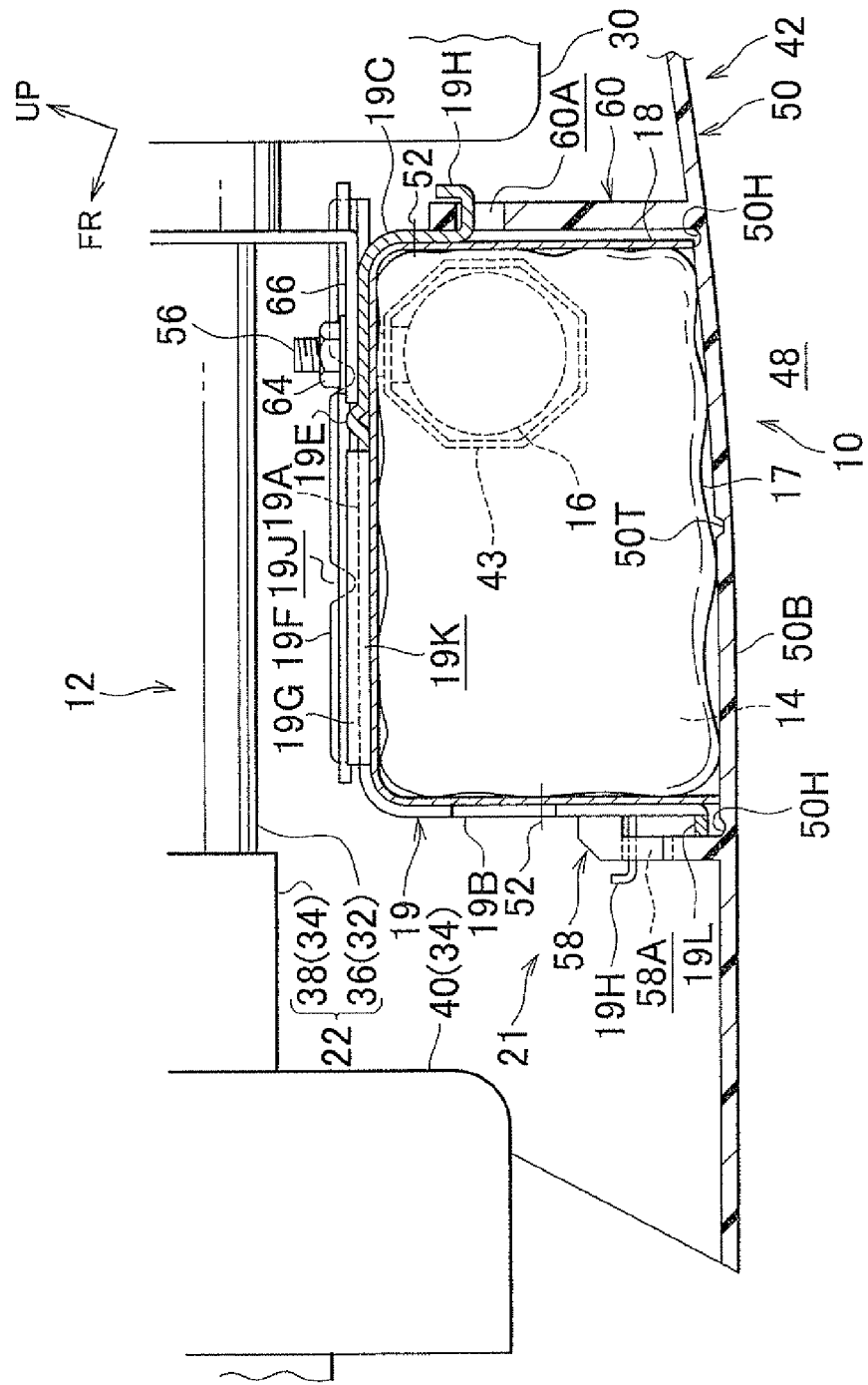
FIG. 2 is an enlarged cross-sectional view showing the steering column mounted knee airbag device of FIG. 1.

An embodiment of the invention will be described with reference to the drawings. Referring to FIG. 1 and FIG. 2, a knee airbag device mounted on a steering column 10 according to the embodiment of the invention is mounted to a steering column 12 of a vehicle, and has a knee airbag 14, an inflator 16, an inner case 18 and an outer case 19. A knee airbag module 21 of the knee airbag device 10 has the knee airbag 14, inflator 16, inner case 18 and the outer case (outer member) 19.

The steering column 12 includes a steering shaft 20 disposed in a center portion of the steering column 12 to extend along the axis of the steering column 12, and a column tube 22 that covers the steering shaft 20. The steering column 12 is inserted through an opening 26 formed in an interior member such as an instrument panel 24 (FIG. 6), and protrudes from the instrument panel 24 toward the rear of the vehicle. A combination switch 30 is provided on a vehicle rear end side of the steering column 12. A steering wheel 28 (FIG. 6) for steering the vehicle is mounted on the vehicle rear end of the steering shaft 20.

The steering shaft 20 and the column tube 22 can be extended and contracted along the axis L of the steering column 12, for example, by an electrically operated tilt-telescopic mechanism (not shown). The steering column 12 has a vehicle-rear-side portion 32 to which the knee airbag module 21 is fixed, and a vehicle-front-side portion 34. When a load F (FIG. 6) equal to or greater than a threshold load is applied from the steering wheel 28 (FIG. 6), for example, to the steering column 12 in the direction of the axis L of the steering column 12, the vehicle-rear-side portion 32 and the vehicle-front-side portion 34 move relative to each other in the direction of the axis L, so that the steering column 12 contracts, thereby absorbing the impact force.

The column tube 22 has a double-tube structure consisting of an inner tube 36 located on the vehicle rear side and an outer tube 38 located on the vehicle front side. In this embodiment, the outer tube 38 has a larger diameter than the inner tube 36. In the steering column 12, the inner tube 36 corresponds to the vehicle-rear-side portion 32, and the outer tube 38 corresponds to the vehicle-front-side portion 34. A column bracket 40 that supports the steering column 12 is provided on the outer tube 38, and the combination switch 30 is provided on a rear end portion of the inner tube 36. The knee airbag module 21 is provided on the vehicle lower side of the inner tube 36.

With the above arrangement, when a load equal to or greater than a threshold load is applied to the steering column 12 in the direction of the axis L of the steering column 12, the inner tube 36, for example, moves forward in the direction of the axis L of the steering column 12, relative to the outer tube 38, so that the column tube 22 contracts, thereby absorbing the impact force. Although not illustrated in the drawings, when the column tube 22 contracts, such as frictional force, is produced between the inner tube 36 and the outer tube 38. With the resistance thus produced, the column tube 22 provides a higher impact absorbing capability even with a limited contraction stroke.

Figure 6:
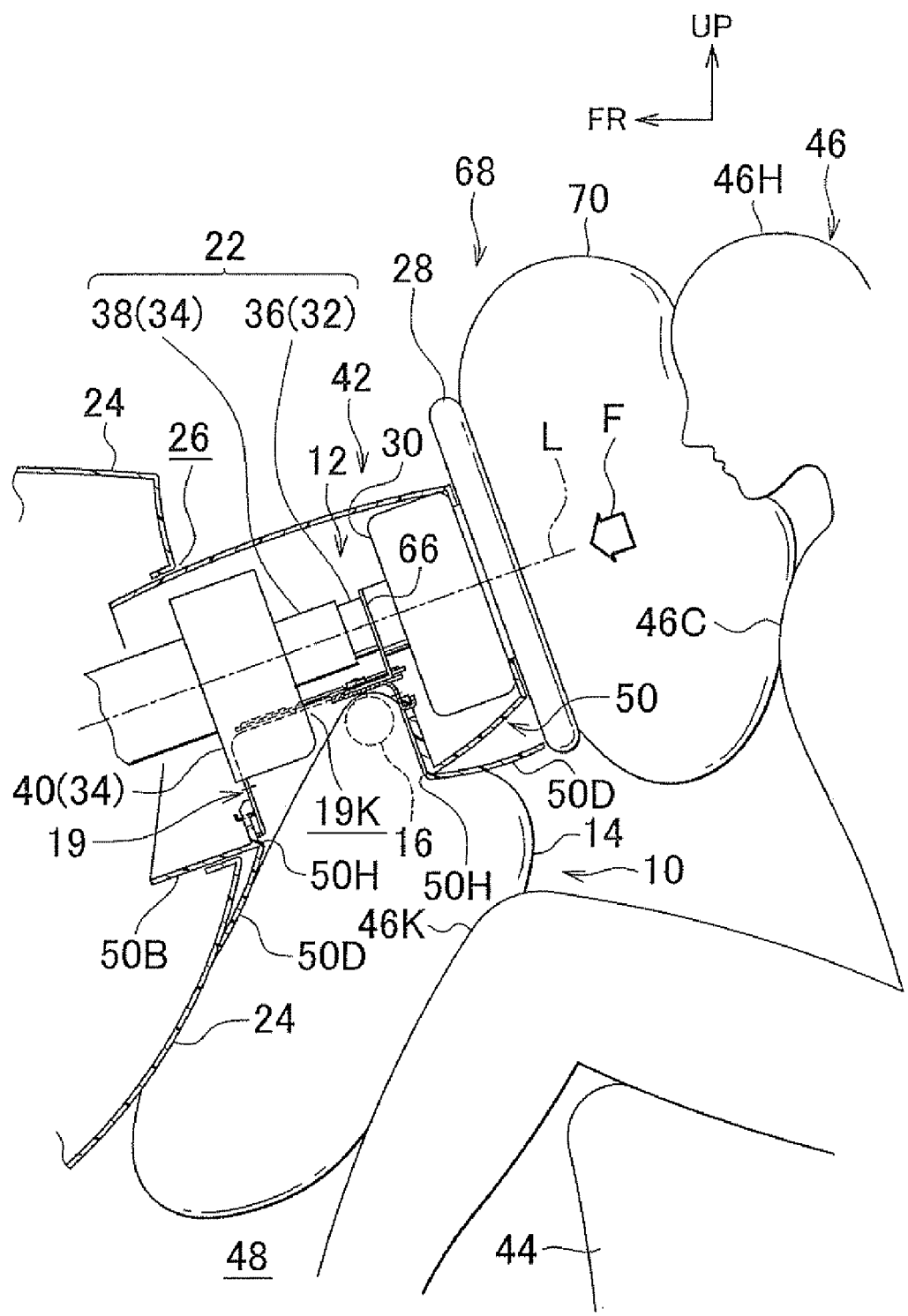
FIG. 6 is a cross-sectional view showing a condition in which the deployed knee airbag restrains the knees of an occupant, and an airbag provided in the steering wheel restrains the head and chest of the occupant, while the steering column contracts in the axial direction so as to absorb shock.

Referring to FIG. 1 and FIG. 2, the knee airbag 14 is placed in a folded state within the column cover 42 that covers the rear end portion of the steering column 12, and is configured to expand and deploy toward the outside of the column cover 42 when gas is supplied from the inflator 16 into the knee airbag 14. More specifically, the knee airbag 14 is folded and the inflator 16 is incorporated within the folded knee airbag. The knee airbag 14 is also covered with a wrapping cloth 17 and housed in the inner case 18 and the outer case 19. As shown in FIG. 6, when gas is supplied from the inflator 16 into the knee airbag 14, the knee airbag 14 can expand and deploy from the column cover 42 toward a passenger compartment 48, more specifically, toward the knees 46K of an occupant 46 seated on a driver's seat 44.

As shown in FIG. 2, a tear line 50T is formed in the vehicle width direction in a bottom wall 50B of a lower cover 50 of the column cover 42, such that the lower cover 50 (bottom wall 50B) is expected to be torn along the tear line 50T. Also, hinge portions 50H are formed in the bottom wall 50B, more specifically, in a vehicle-rear-side base portion of a front wall 58 formed on the bottom wall 50B and a vehicle-front-side base portion of a rear wall 60 formed on the bottom wall 50B.

Figure 4:
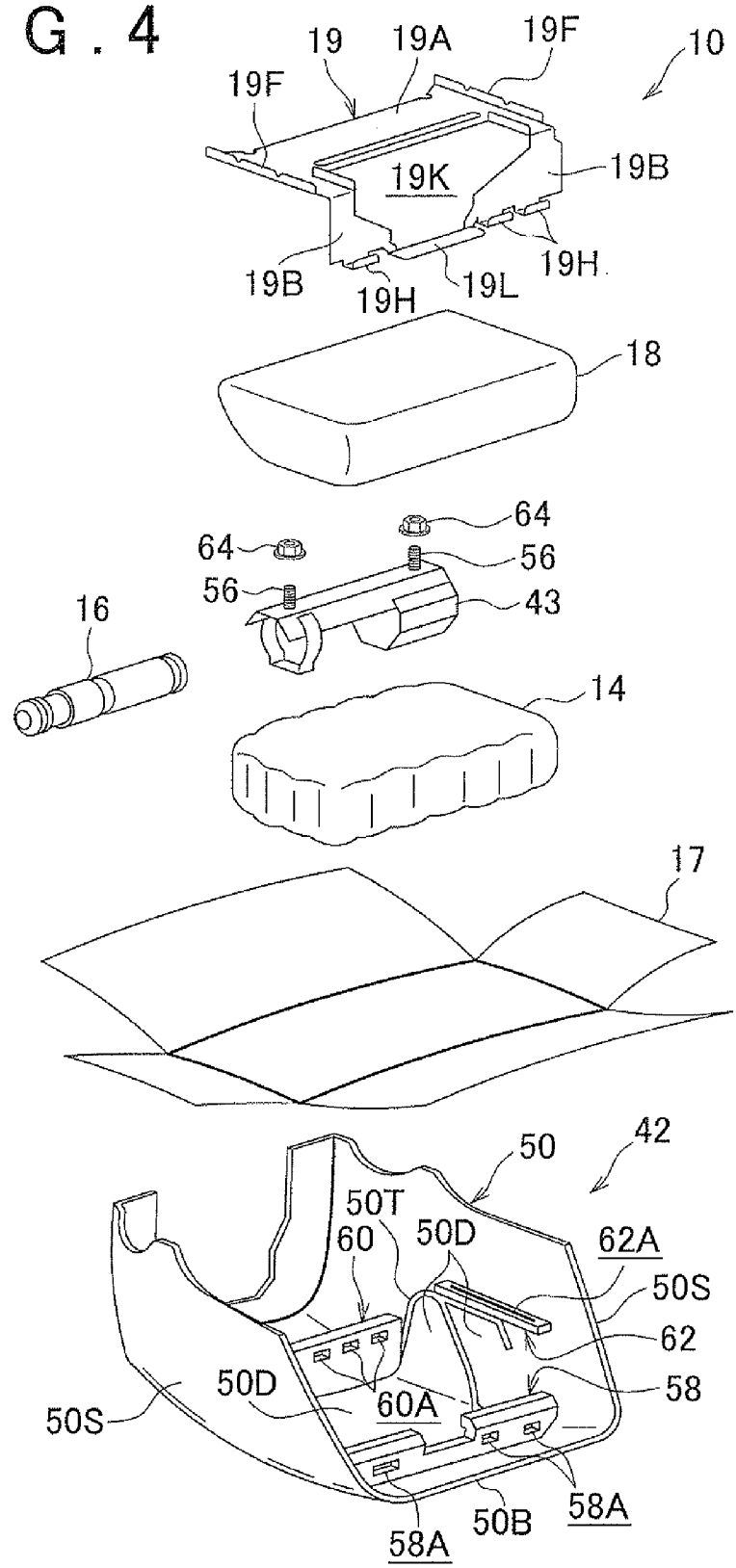
FIG. 4 is an exploded, perspective view showing the steering column mounted knee airbag device of FIG. 1.
Figure 7:
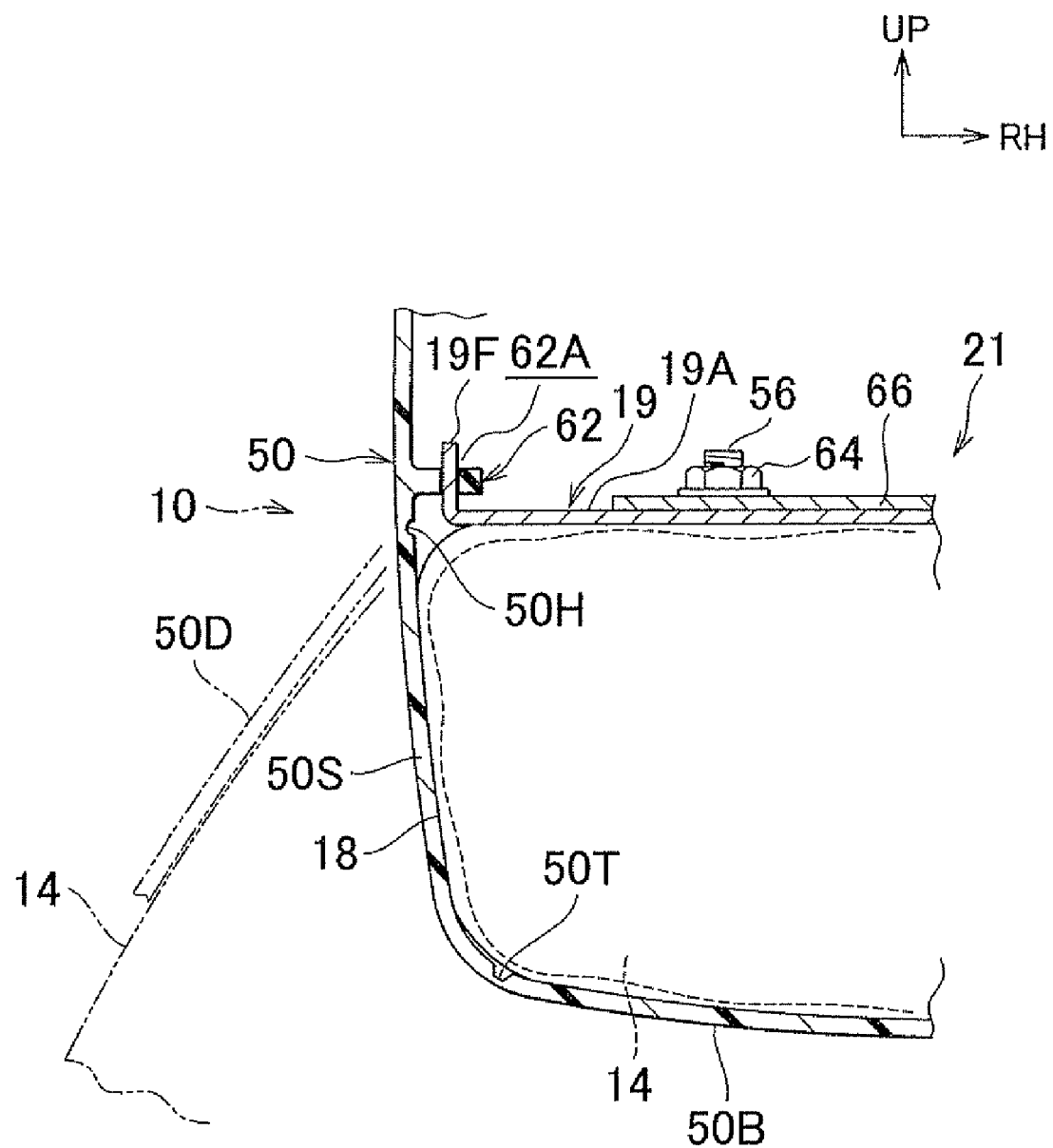
FIG. 7 is an enlarged cross-sectional view showing an arrangement in which an upper engaging portion of an outer case is engaged with an engaging portion of a side wall of a lower cover, so that the side wall is less likely or unlikely to deform outward in the vehicle width direction when the inflation pressure of the knee airbag is applied to the side wall, and an airbag door provided in the side wall opens quickly.

As shown in FIG. 7, a tear line 50T is also formed in the longitudinal direction of the lower cover 50, along a boundary between the bottom wall 50B of the lower cover 50 and each of opposite side walls 50S, and a hinge portion 50H is also formed in the side wall 50S of the lower cover 50, for example, at one side of a top wall 19A of the outer case 19 as viewed in the vehicle lateral (or width) direction. The side wall 50S is formed with an engaging portion 62 that is engaged with a corresponding one of upper engaging portions 19F of the outer case 19, such that the engaging portion 62 protrudes toward the inside of the lower cover 50. The hinge portion 50H of the side wall 50S is located on the vehicle lower side of the engaging portion 62. As shown in FIG. 4, the engaging portion 62 is formed with a continuous or discontinuous slot 62A into which the upper engaging portion 19F of the outer case 19 is fitted. The slot 62A may be a through hole or a non-through hole, depending on the depth of fitting of the upper engaging portion 19F.

Figure 5:
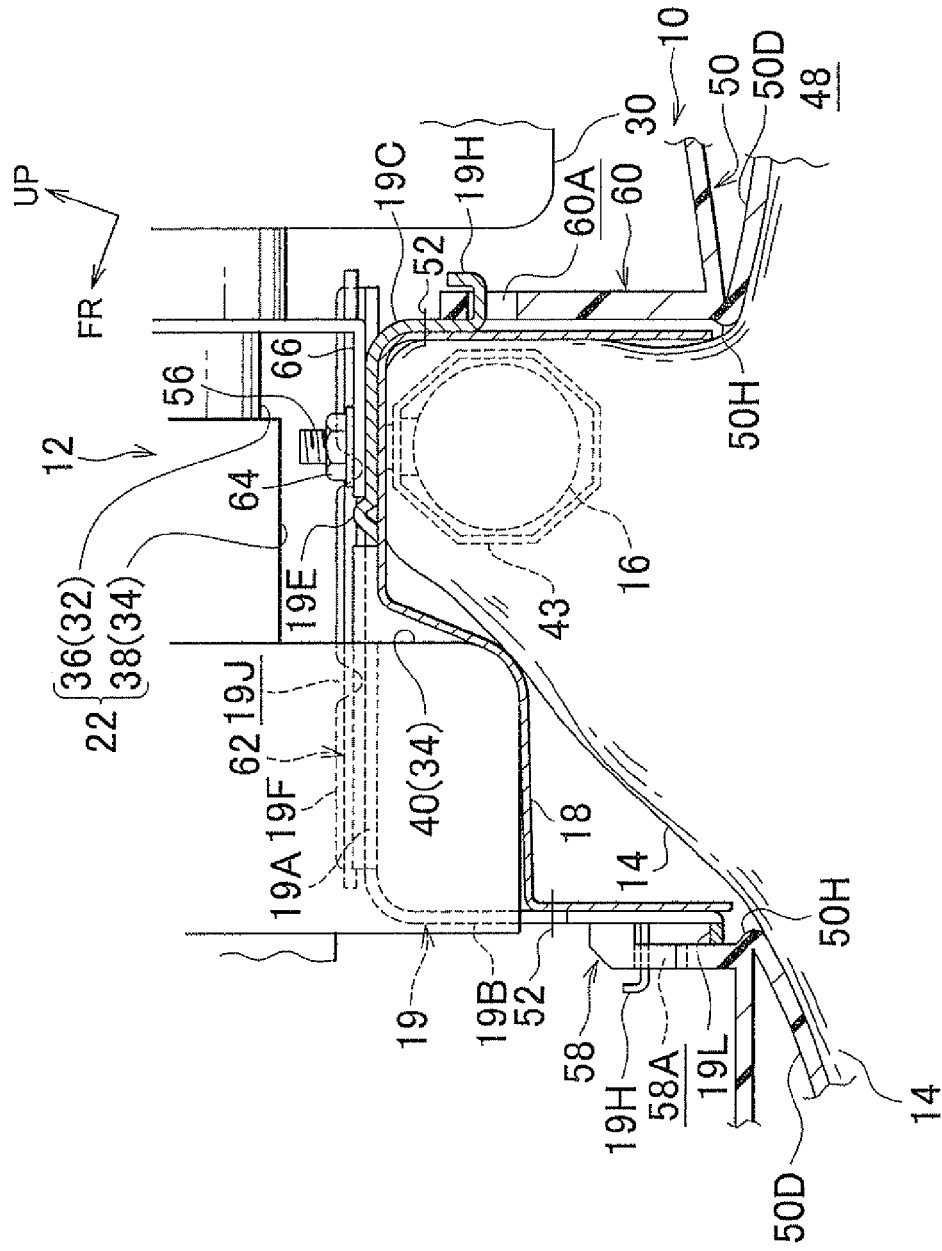
FIG. 5 is an enlarged cross-sectional view showing a condition in which, a knee airbag expands and deploys and a steering column contracts so as to absorb shock, in which an outer case does not interfere with a column bracket as a vehicle-front-side portion of the steering column.

As shown in FIG. 5 and FIG. 7, in an early stage of deployment of the knee airbag 14, the inflation pressure of the knee airbag 14 is applied to the lower cover 50, so that the lower cover 50 is torn along the tear lines 50T, and airbag doors 50D provided by parts of the lower cover 50 deploy or open in the vehicle longitudinal direction and vehicle width direction, while pivoting about the hinge portions 50H. In this manner, the knee airbag 14 is deployed into the passenger compartment 48.

The inflator 16 is placed, along with a diffuser 43 for example, in the knee airbag 14 in the column cover 42. The diffuser 43 is, for example, a cylindrical member for controlling flow of gas supplied from the inflator 16. The inflator 16 is disposed on the vehicle lower side of the steering column 12, to extend in a direction perpendicular to the axis L of the steering column 12. In the inner case 18 and the outer case 19, the inflator 16 is located closer to the rear wall 60 (at an offset position from the center to the rear end as viewed in the longitudinal direction of the vehicle). In other words, the inflator 16 is located in rear portions of the inner case 18 and outer case 19 as viewed in the longitudinal direction of the vehicle so as to extend in the vehicle width direction (i.e., the longitudinal direction of the inflator 16 is parallel to the vehicle width direction). This arrangement assures an increased contraction stroke of the steering column 12. It is to be understood that the "perpendicular" mentioned above is not limited to the geometric sense of the term, but may include "substantially or generally perpendicular".

The inflator 16, which has a generally cylindrical shape, is a gas supply or source that supplies the knee airbag 14 with gas to inflate the airbag 14 when the inflator 16 is actuated in response to an ignition current signal from an airbag ECU (not shown). The airbag ECU is configured to cause actuating current to pass through the inflator 16 when it determines a front collision of the vehicle has occurred based on a signal from an impact sensor (not shown).

Figure 3:
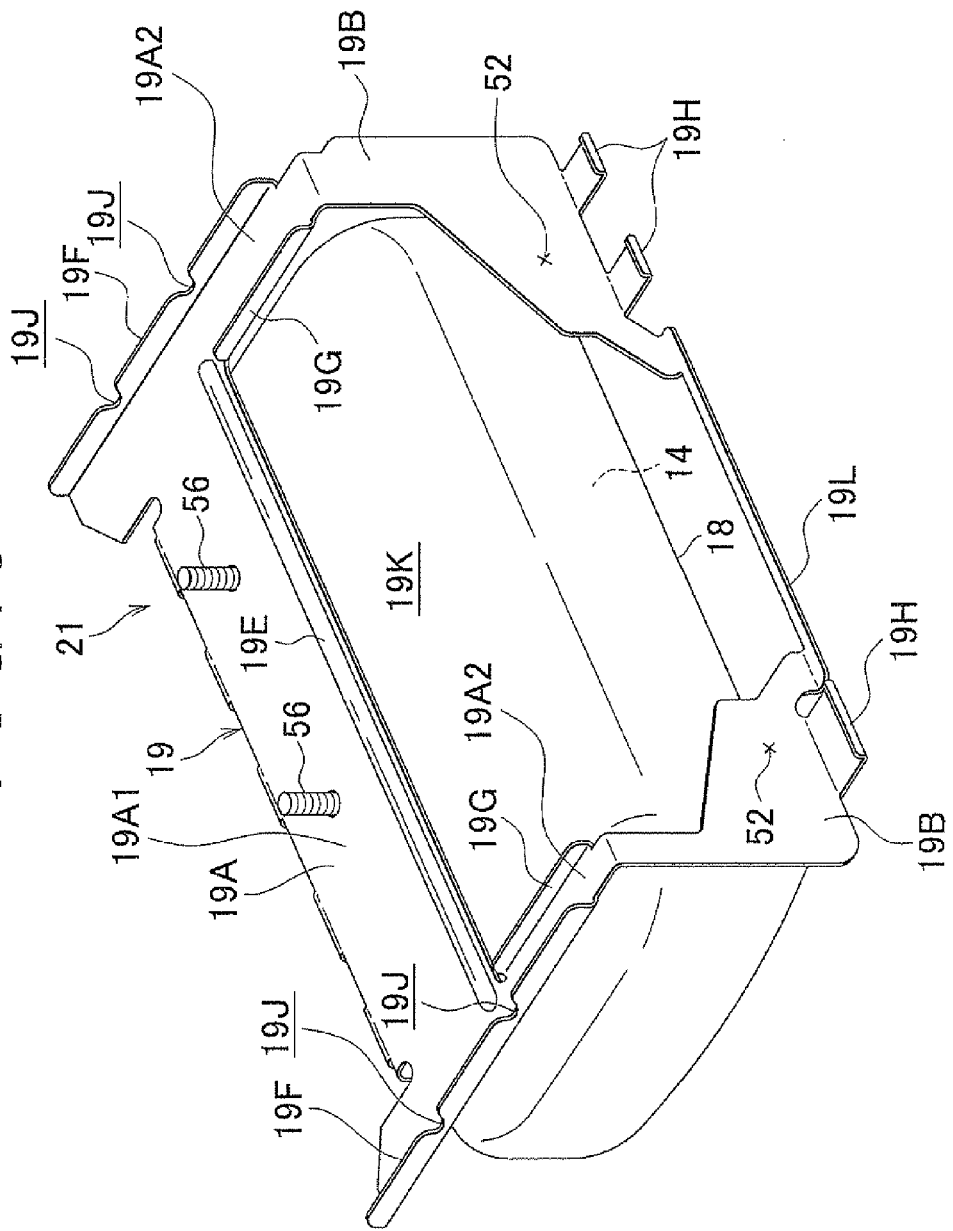
FIG. 3 is a perspective view showing a knee airbag module.

Referring to FIG. 2 through FIG. 4, the inner case 18 is a storage member having flexibility and made of fabric, for example, and houses the folded knee airbag 14. The inner case 18 is joined to the outer case 19 at certain joints 52, and is open to the bottom wall 50B side of the lower cover 50 (on the vehicle lower side) in view of the direction of deployment of the knee airbag 14. Although not illustrated in the drawings, the inner case 18 may be open on the side walls 50S sides (on the opposite sides in the vehicle width direction), as well as the bottom wall 50B side of the lower cover 50. In this case, the knee airbag 14 is smoothly deployed on the opposite sides in the vehicle width direction, and promptly enters a space between the knees 46K of the occupant 46 and the instrument panel 24.

In FIG. 2 through FIG. 4, the outer case 19 is placed over the inner case 18 from the upper side of the vehicle, and is fixed to the vehicle lower side of the vehicle-rear-side portion 32 that moves frontward relative to the vehicle-front-side portion 34 when a load F equal to or greater than a threshold load is applied to the steering column 12 in the axial direction of the steering column 12. The outer case 19 has rigidity high enough to hold the shape of the folded knee airbag 14 under normal conditions, and includes an opening 19K formed in a region where the knee airbag module 21 interferes with the vehicle-front-side portion 34 when the vehicle-rear-side portion 32 moves relative to the vehicle-front-side portion 34.

More specifically, the outer case 19 is formed by bending a steel plate, for example, into a generally inverted J-shaped member in a section as viewed from a side face of the vehicle. The outer case 19 has the top wall 19A disposed on the vehicle lower side of the steering column 12 in parallel with the axis L (FIG. 1) of the steering column 12, front walls 19B that extend downward from the front end of the top wall 19A, and a rear wall 19C that extends downward from the rear end of the top wall 19A. A dimension of the outer case 19 measured in the vehicle width direction is substantially equal to that of the folded knee airbag 14. The outer case 19 is open on the lower side of the vehicle and on the opposite sides in the vehicle width direction. As shown in FIG. 3, the outer case 19 (the outer member) may consist of a mounting portion 19A1 mounted to the steering column 12, which is placed on the vehicle upper side of the inner case 18, extensions 19A2 that extend forward in a longitudinal direction of the vehicle from the opposite end portions of the mounting portion 19A1, front walls 19B that are placed on the vehicle front side of the inner case 18 and extend downwards from the front ends of the extensions 19A2, and a rear wall 19C that is placed on the vehicle rear side of the inner case 18 and extends downward from the rear end of the mounting portion 19A1. The extensions 19A2 are spaced from each other by a distance larger than the width of the vehicle-front-side portion 34 of the steering column 12 as measured in the vehicle width direction.

As shown in FIG. 2, the outer case 19 is joined to the inner case 18 at certain joints 52 in the front wall 19B and the rear wall 19C, for example. More specifically, the outer case 19 is bonded to or engaged with the inner case 18. The joints between the outer case 19 and the inner case 18 are not limitedly located in the front wall 19B and rear wall 19C of the outer case, but the inner case 18 may be engaged with the outer case 19 using, for example, lower engaging portions 19H (which will be described below).

The front wall 19B and rear wall 19C of the outer case 19 are provided at their lower ends with lower engaging portions (hooks) 19H engaged with the column cover 42. More specifically, the lower engaging portions 19H are engaged with the front wall 58 and rear wall 60, respectively, formed on the bottom wall 50B of the lower cover 50. Also, the upper engaging portions 19F engaged with the engaging portions 62 of the side walls 50S of the lower cover 50 are formed integrally on the extensions 19A2 of the outer case 19 so as to extend in the direction of the axis L (FIG. 1) of the steering column 12. A reinforcing bead 19E that extends in the vehicle width direction is formed on the vehicle front side of the mounting portion 19A1.

The opening 19K is formed in a region that overlaps the top wall 19A and the front walls 19B. The range or area of the opening 19K is determined in view of the contraction stroke of the steering column 12 and the shape of the vehicle-front-side portion 34, so that the outer case 19 does not interfere with, for example, the column bracket 40 as a part of the vehicle-front-side portion 34 when the steering column 12 is completely contracted. More specifically, the projected area of the opening 19K as measured in the direction of the axis L of the steering column 12 is set to be larger than the projected area of the vehicle-front-side portion 34 on the outer case 19. Also, the distance from the vehicle front end of the mounting portion 19A1 to the rear end of the vehicle-front-side portion 34 is larger than the distance over which the vehicle-rear-side portion 32 moves relative to the vehicle-front-side portion 34.

As shown in FIG. 2 and FIG. 3, the extensions 19A2 extend rearward in the vehicle longitudinal direction to protrude from the rear wall 19C and are terminated. Edges 19G of the extensions 19A2 located on an inner side in the width direction of the vehicle (adjacent to the opening 19K) are bent upward so as to increase the modulus of section of the top wall 19A. As described above, the upper engaging portions 19F are formed on the outer edges in the vehicle width direction of the top wall 19A, and each of the extensions 19A2 located adjacent to the opening 19K is generally U-shaped in cross section in the presence of the upper engaging portion 19F and the edge 19G. Two arcuate notches 19J, for example, are formed in each of the upper engaging portions 19F. The notches 19J are used for positioning the outer case 19 with respect to the lower cover 50, for example. It is, however, to be understood that the notches 19J may not be formed.

The front walls 19B of the outer case 19 are connected (by a connecting portion 19L) to each other in the vehicle width direction, at a position where the outer case 19 does not interfere with the vehicle-front-side portion 34 of the steering column 12. The connecting portion 19L is formed at a position that is lower than the lower engaging portions 19H. When the outer case 19 is mounted on the lower cover 50, the connecting portion 19L is located close to the vehicle rear side of the front wall 58 and the bottom wall 50B, as shown in FIG. 2. The connecting portion 19L is positioned as described above in order to avoid interference between the outer case 19 and the column bracket 40 when the steering column 12 contracts.

As shown in FIG. 2, the front wall 58 and rear wall 60 for controlling the direction of deployment of the knee airbag 14 and facilitating its expansion and deployment toward the vehicle department 48 (FIG. 5) are formed integrally on the inner surface of the lower cover 50 of the column cover 42, to extend upright from the bottom wall 50B. The front wall 58 is located adjacent to the vehicle front side of the knee airbag module 21, and the rear wall 60 is located adjacent to the vehicle rear side of the knee airbag module 21. A plurality of through holes 58A, 60A corresponding to the lower engaging portions 19H of the outer case 19 are formed in the front wall 58 and the rear wall 60, respectively, such that the through holes 58A, 60A are aligned in the vehicle width direction. The lower engaging portions 19H formed at the vehicle rear side of the outer case 19 are engaged with the through holes 60A of the rear wall 60, and the lower engaging portions 19H formed at the vehicle front side of the outer case 19 are engaged with the through holes 58A of the front wall 58. The knee airbag module 21 is mounted on the lower cover 50 before it is mounted to the steering column 12.

The height of the rear wall 19C of the outer case 19 as measured from the top wall 19A is set to be smaller than that of the front wall 19B, and therefore, the height of the rear wall 60 as measured from the bottom wall 50B of the lower cover 50 is set to be larger than that of the front wall 58. Thus, even though the height of the real wall 19C of the outer case 19 is relatively small, the rear wall 60 of the lower cover 50 is made high so that the knee airbag 14 is prevented from expanding and deploying toward the rear of the vehicle in the column cover 42.

As shown in FIG. 4, an upper portion of a region of the front wall 58 of the lower cover 50, which region is opposed to the connecting portion 19L of the outer case 19 in the direction of the axis L (FIG. 1) of the steering column 12, is recessed so as to avoid interference with the column bracket 40 when the steering column 12 contracts.

As shown in FIG. 1 and FIG. 2, a L-shaped mounting bracket 66 when viewed from the side, for example, is fixed to the inner tube 36 of the steering column 12. Stud bolts 56 that are erected on the diffuser 43 extend through the knee airbag 14, wrapping cloth 17, inner case 18, top wall 19A of the outer case 19 and the mounting bracket 66, and nuts 64 are fastened to the ends of the stud bolts 56 that project through the mounting bracket 66. In this manner, the knee airbag module 21 is mounted, along with the lower cover 50, to the vehicle lower side of the vehicle-rear-side portion 32.

In the knee airbag device mounted on a steering column 10 of this embodiment constructed as described above, the folded knee airbag 14 is housed in the flexible inner case 18, and the outer case 19 is placed over the inner case 18 from the upper side of the vehicle, as shown in FIG. 1 and FIG. 2, so that the outer case 19 can hold the shape of the folded knee airbag 14.

In particular, the opening 19K is formed in a region of the outer case 19 which overlaps the top wall 19A and the front walls 19B, and the front walls 19B are connected (by the connecting portion 19L) to each other in the vehicle width direction, at a position where the outer case 19 does not interfere with the column bracket 40, thus assuring further improved rigidity of the outer case 19. Therefore, the shape of the folded knee airbag 14 can be maintained with increased stability under normal conditions. Thus, under normal conditions, the knee airbag 14 is prevented from coming out of the inner case 18, and the folds of the knee airbag 14 do not collapse at locations where the airbag 14 is not covered with the inner case 18. When a tilting operation or telescopic operation is performed on the steering column 12, therefore, the knee airbag 14 of which the folds are kept in shape is prevented from interfering with the steering column 12

Referring to FIG. 5, in the knee airbag device mounted on a steering column 10 of this embodiment, when the airbag ECU determines a front collision has occurred based on a signal from an impact sensor (not shown), the airbag ECU causes actuating current to pass through the inflator 16. Upon receiving the actuating current, the inflator 16 expels a large amount of gas through a gas discharge hole. The gas thus expelled is supplied to the knee airbag 14, so that the knee airbag 14 is inflated to expand.

As shown in FIG. 5 and FIG. 7, in the early stage of deployment of the knee airbag 14 in the column cover 42, the reaction force is applied from the inner case 18 and the outer case 19 to the knee airbag 14. As a result, the inflation pressure of the knee airbag 14 is efficiently applied to the bottom wall 50B and side walls 50S of the lower cover 50, so that the lower cover 50 is torn along the tear lines 50T, and the airbag doors 50D provided by parts of the lower cover 50 are opened.

More specifically, as shown in FIG. 5, the lower engaging portions 19H engaged with the bottom wall 50B of the lower cover 50 are provided on the front wall 19B and rear wall 19C, respectively, of the outer case 19. With this arrangement, the reaction force is produced at the outer case 19 in the early stage of deployment of the knee airbag 14, and the inflation pressure of the knee airbag 14 can be applied to the lower cover 50. As a result, the airbag doors 50D provided in the lower cover 50 can be quickly opened.

Also, as shown in FIG. 7, the upper engaging portions 19F engaged with the side walls 50S of the lower cover 50 are provided on the extensions 19A2 of the outer case 19. Therefore, when the inflation pressure of the knee airbag 14 is applied to the side walls 50S, the side walls 50S are less likely or unlikely to deform outward in the vehicle width direction. As a result, the airbag doors 50D provided in the side walls 50S can also be quickly deployed.

Thus, in the knee airbag device mounted on a steering column 10 of this embodiment, the airbag doors 50D provided in the lower cover 50 are quickly opened, to allow the knee airbag 14 to expand and deploy to the outside of the column cover 42 at an earlier time or in a short time. As shown in FIG. 6, the knee airbag 14 expands and deploys from the column cover 42 toward the knees 46K of the occupant 46 seated on the driver's seat 44 (or toward the passenger compartment 48), so that the knees 46K are stably restrained by the knee airbag 14. When the knees 47K are restrained, the reaction force can be obtained from the instrument panel 24.

On the other hand, where an airbag device 68 having an airbag 70 is provided in the steering wheel 28, as shown in FIG. 6, the head 46H and chest 46C of the occupant 46 are restrained by the airbag 70 that expands and deploys upon a front collision. At this time, if a load F equal to or greater than a threshold load is applied forward in the direction of the axis L of the steering column 12, the vehicle-rear-side portion 32 moves frontward relative to the vehicle-front-side portion 34, so that the steering column 12 contracts, thereby absorbing the impact force.

In this embodiment, the outer case 19 of the knee airbag module 21 is fixed to the vehicle lower side of the inner tube 36 of the steering column 12, and the opening 19K is formed in a region where the outer case 19 would interfere with the column bracket 40 when the inner tube 36 moves relative to the outer tube 38. With this arrangement, when the steering column 12 contracts, as shown in FIG. 5, the column bracket 40 is prevented from interfering with the outer case 19.

When the inner case 18 and the column bracket 40 interfere with each other, the flexible inner case 18 deforms, as shown in FIG. 5, thereby allowing the vehicle-rear-side portion 32 to move relative to the vehicle-front-side portion 34. Accordingly, the steering column 12 can smoothly contract until the column bracket 40 enters the outer case 19, thus assuring a sufficiently large contraction stroke of the steering column 12. In the meantime, the knee airbag 14 does not interfere with the column bracket 40 since the airbag 14 expands and deploys at an earlier point in time than the time at which the steering column 12 starts contracting.

In this embodiment, the inflator 16 is placed below the steering column 12, to extend in the direction perpendicular to the axis L of the steering column 12, and is located closer to the rear of the inner case 18 and outer case 19. This arrangement assures an increased contraction stroke of the steering column 12.

In the embodiment constructed as described above, as shown in FIG. 3, the front walls 19B of the outer case 19 are connected (by the connecting portion 19L) in the vehicle width direction, at a position where the outer case 19 does not interfere with the vehicle-front-side portion 34 of the steering column 12. However, the invention is not limited to this arrangement. For example, the front walls 19B may not be connected to each other in the vehicle width direction, as shown in FIG. 8 by way of example. Also, the top wall 19A may not be provided with the bead 19E (FIG. 3). Also, the edges 19G of the extensions 19A2 located on an inner side in the width direction of the vehicle (adjacent to the opening 19K) may not be bent upwards.

What is claimed is:

1. A knee airbag device mounted to a steering column of a vehicle, comprising:

a knee airbag that is placed in a folded state within a column cover that covers a rear end portion of the steering column, and is configured to deploy toward the outside of the column cover when gas is supplied to the knee airbag;

an inflator that is placed in the knee airbag, and is configured to supply the knee airbag with gas;

an inner case that has flexibility and houses the folded knee airbag; and an outer member that is fixed to a lower side of a vehicle-rear-side portion of the steering column that moves relative to a vehicle-front-side portion of the steering column when a load equal to or greater than a threshold load is applied to the steering column in an axial direction of the steering column, the outer member having a rigidity with which the shape of the folded knee airbag is maintained under normal conditions, wherein the outer member includes:

a mounting portion mounted to the steering column, which is placed on an upper side of the inner case; and extensions that extend forward in a longitudinal direction of the vehicle from opposite end portions of the mounting portion and are spaced from each other by a distance larger than a length of the vehicle-front-side portion as measured in the width direction of the vehicle, and the outer member further includes:
- front walls that are placed, in a longitudinal direction of the vehicle, on a front side of the inner case and extend downward from front ends of the extensions; and
- a rear wall that is placed, in a longitudinal direction of the vehicle, on a rear side of the inner case and extends downward from a rear end of the mounting portion, and wherein an opening is formed by the mounting portion, the extensions and the front walls and is located in a region where the outer member would interfere with the vehicle-front-side portion when the vehicle-rear-side portion moves relative to the vehicle-front-side portion.

2. The steering column mounted knee airbag device according to claim 1, wherein
inner edges of the extensions in the width direction of the vehicle are bent upward.

3. The steering column mounted knee airbag device according to claim 1, further comprising
a mounting bracket fixed to the vehicle-rear-side portion, wherein
the mounting portion is mounted to the steering column via the mounting bracket.

4. The steering column mounted knee airbag device according to claim 1, wherein
the mounting portion includes a bead formed on a front side of the mounting portion in a longitudinal direction of the vehicle, and the bead extends in a width direction of the vehicle.

5. The steering column mounted knee airbag device according to claim 1, wherein
a projected area of the opening in an axial direction of the steering column is larger than a projected area of the vehicle-front-side portion on the outer member in the axial direction of the steering column.

6. The steering column mounted knee airbag device according to claim 1, wherein
a distance from a front end of the mounting portion to a rear end of the vehicle-front-side portion, in a longitudinal direction of the vehicle, is larger than a distance over which the vehicle-rear-side portion moves relative to the vehicle-front-side portion.

7. The steering column mount knee airbag device according to claim 1, wherein
the extensions and the mounting portion are disposed in parallel with an axis of the steering column.

8. The steering column mounted knee airbag device according to claim 1, wherein
at least a part of the vehicle-front-side portion enters the opening when the vehicle-rear-side portion moves relative to the vehicle-front-side portion.

9. The steering column mounted knee airbag device according to claim 1, wherein
the inner case is exposed through the opening.

10. The steering column mounted knee airbag device according to claim 1, wherein
the inflator is placed below the mounting portion, transversely with respect to an axis of the steering column.

11. The steering column mounted knee airbag device according to claim 1, further comprising
front and rear walls in a longitudinal direction of the vehicle that are formed on a bottom wall of the column cover to extend upright toward the steering column, wherein:
- the front and rear walls of the outer member are provided with front and rear engaging portions respectively; and
- the front and rear engaging portions are engaged with the front and rear walls formed on the column cover, respectively.

12. The steering column mounted knee airbag device according to claim 11, wherein:
- outer edges of the extensions in the width direction of the vehicle are provided with engaging portions; and
- the engaging portions are engaged with side walls of the column cover.

13. The steering column mounted knee airbag device according to claim 11, wherein
a height of the rear wall formed on the column cover is larger than that of the front wall formed on the column cover.

14. The steering column mounted knee airbag device according to claim 1, wherein:
- outer edges of the extensions in the width direction of the vehicle are provided with engaging portions; and
- the engaging portions are engaged with side walls of the column cover.

15. The steering column mounted knee airbag device according to claim 14, wherein:
- the side walls are provided with engaging portions that is engage with the engaging portions of the extensions and protrudes toward the inside of the lower cover; and
- the side walls are provided with hinge portions located below the engaging portions of the side walls; and
- the side walls open in the width direction of the vehicle while pivoting about the hinge portions when the knee airbag deploys.

16. The steering column mounted knee airbag device according to claim 1, wherein:
the outer member further includes a connecting portion that connects the front walls in a width direction of the vehicle and is located at a position where the front walls do not interfere with the vehicle-front-side portion of the steering column when the vehicle-rear-side portion moves relative to the vehicle-front-side portion.

17. A knee airbag device mounted to a steering column of a vehicle, comprising:
- a knee airbag that is placed in a folded state within a column cover that covers a rear end portion of the steering column, and is configured to deploy toward the outside of the column cover when gas is supplied to the knee airbag;
- an inflator that is placed in the knee airbag, and is configured to supply the knee airbag with gas;
- an inner case that has flexibility and houses the folded knee airbag; and
- an outer case that is placed over the inner case, and is fixed to a lower side of a vehicle-rear-side portion of the steering column that moves relative to a vehicle-front-side portion of the steering column when a load equal to or greater than a threshold load is applied to the steering column in an axial direction of the steering column, the outer case having a rigidity with which the shape of the folded knee airbag is maintained under normal conditions, and having an opening formed in a region in which the outer case would interfere with the vehicle-front-side portion when the vehicle-rear-side portion moves relative to the vehicle-front-side portion.

* * * * *